(12) United States Patent
Graber

(10) Patent No.: US 8,328,161 B2
(45) Date of Patent: Dec. 11, 2012

(54) SANITARY FITTING WITH SEPARATE MOUNTING FOR THE ACTUATING LEVER

(75) Inventor: Heinz Graber, Oberkulm (CH)

(73) Assignee: KWC AG, Unterkulm (CH)

( * ) Notice: Subject to any disclaimer, the term of this patent is extended or adjusted under 35 U.S.C. 154(b) by 590 days.

(21) Appl. No.: 12/385,606

(22) Filed: Apr. 14, 2009

(65) Prior Publication Data

US 2009/0256096 A1 Oct. 15, 2009

(30) Foreign Application Priority Data

Apr. 15, 2008 (EP) .................................. 08 007 342

(51) Int. Cl.
*F16K 31/52* (2006.01)

(52) U.S. Cl. .................... 251/237; 251/233; 137/625.17

(58) Field of Classification Search ............... 137/625.4, 137/625.41, 801, 625.17, 454.2; 251/284, 251/231, 237, 288, 233; 4/675–678
See application file for complete search history.

(56) References Cited

U.S. PATENT DOCUMENTS

| 5,144,981 A | 9/1992 | Bergmann |
| 5,522,429 A * | 6/1996 | Bechte et al. ............ 137/625.17 |
| 2009/0256096 A1 | 10/2009 | Graber |

FOREIGN PATENT DOCUMENTS

| DE | 33 27 776 A1 | 2/1985 |
| DE | 38 38 765 A1 | 5/1990 |
| DE | 004443123 A1 * | 12/1994 |
| DE | 93 12 826 U1 | 2/1995 |
| DE | 44 43 123 A1 | 6/1996 |
| EP | 0 426 587 A1 | 5/1991 |
| EP | 0 426 639 A1 | 5/1991 |

OTHER PUBLICATIONS

Co=pending U.S. Appl. No. 12/881,682, filed Sep. 14, 2010.
European Patent Office, European Search Report for EP 09 01 3192 (with English-language translation), Mar. 10, 2010, pp. 1-3 (pp. 1-2 for translation).
Jun. 20, 2012 Notice of Allowance issued in U.S. Appl. No. 12/881,682.

\* cited by examiner

*Primary Examiner* — John K Fristoe, Jr.
*Assistant Examiner* — Time Aigbe
(74) *Attorney, Agent, or Firm* — Oliff & Berridge, PLC

(57) ABSTRACT

The fitting housing contains a control cartridge, of which the control shank can be pivoted about the pivot axis. The actuating lever can be displaced relative to the control shank, is mounted on the latter and can be pivoted via its own lever axis, this lever axis being guided in the guide track. When the actuating lever is pivoted up and down, it executes a displacement movement relative to the control shank, and this prevents contact between the actuating lever and the fitting housing.

9 Claims, 7 Drawing Sheets

SANITARY FITTING WITH SEPARATE MOUNTING FOR THE ACTUATING LEVER

BACKGROUND

The present invention relates to a sanitary fitting.

Sanitary fittings of this type are known in general. An actuating lever is seated firmly on a control shank of a control cartridge arranged in a fitting housing. By virtue of the actuating lever being pivoted up and down, the control shank is pivoted about its pivot axis, and this controls the water flow through the sanitary fitting. In order to rule out conflict between the actuating lever and the fitting housing, it is often necessary to provide a large spacing between the fitting housing and the actuating lever or to form a recess or a cutout on the actuating lever and/or on the fitting housing, which, on the one hand, involves high outlay and, on the other hand, is unsightly.

SUMMARY

It is therefore an object of the present invention to develop a sanitary fitting of the generic type so as to overcome the abovementioned disadvantages.

This object is achieved by a sanitary fitting that includes a fitting housing. The fitting housing includes a control cartridge that is arranged in the fitting housing, and a control shank that is structured to be pivoted about a pivot axis; and an actuating lever, that interacts with the control shank, wherein the actuating lever is pivotable up and down between a bottom end position and a top end position in order to pivot the control shank about the pivot axis and to thereby control the water flow, and wherein the actuating lever is mounted such that it can be pivoted about a lever axis running parallel to the pivot axis, and the control shank is accommodated in a guide of the actuating lever. Since the actuating lever can be pivoted about its own pivot axis, it is possible to avoid conflict, during the movement of the actuating lever, between the latter and the fitting housing. When the actuating lever is pivoted up and down, the control shank is pivoted about its pivot axis since it is mounted in a guide of the actuating lever.

The axis of the lever may be arranged in a stationary manner in relation to the pivot axis. It is preferred, however, for the lever axis to be guided in a guide track, and, due to the control shank and the actuating lever being subject to guidance at a spacing apart from the pivot axis, this results in the actuating lever, as it pivots about the lever axis, executing a translatory movement along the guide track in addition to the pivoting movement. In particular, corresponding shaping of the guide track can achieve translatory movement with a component in the direction of the longitudinal axis of the control cartridge and/or in the longitudinal direction of the control shank. Such measures make it possible to pass by the fitting housing when the actuating lever is pivoted up and down, in order to prevent conflict therewith without externally visible, conflict-preventing recesses having to be provided on the fitting housing or actuating lever.

BRIEF DESCRIPTION OF THE DRAWINGS

The invention will be explained with reference to an exemplary embodiment illustrated in the drawing, in which, purely schematically.

DETAILED DESCRIPTION OF EMBODIMENTS

Figure 1:
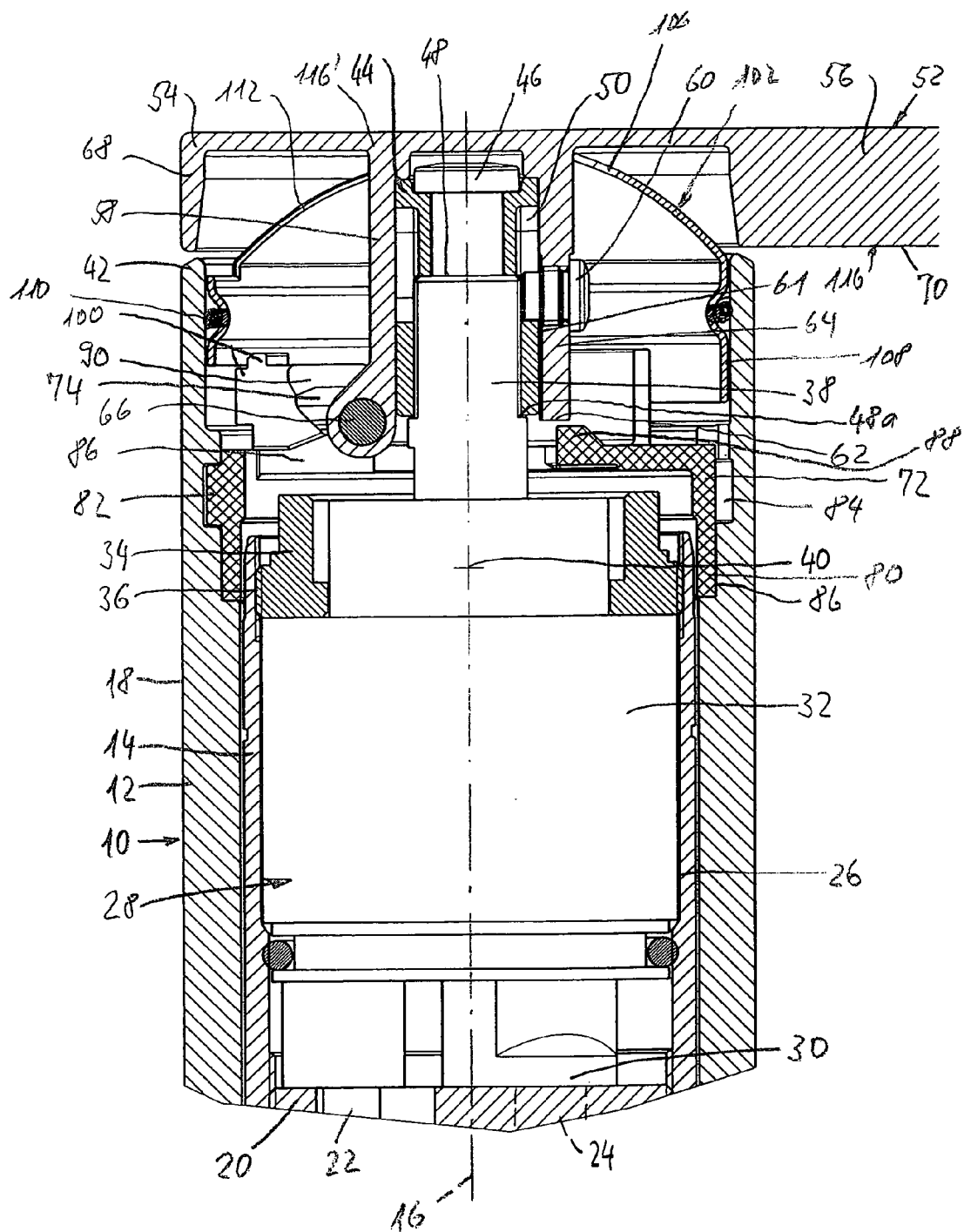
FIG. 1 shows a longitudinal section through part of a sanitary fitting according to the invention.

A sanitary fitting according to the invention which is illustrated in FIG. 1 has a fitting housing 10 with an outer housing 12 and an inner housing 14. The outer housing 12 is of hollow-cylindrical design and has an outer circular-cylindrical lateral surface 18 which is concentric with a housing axis 16.

The outer housing 12 contains, in its interior, the inner housing 14, which is likewise of hollow-cylindrical design, but is provided with an intermediate base 20. The inner housing 14 is intended, in a generally known manner, for being fastened on a washbasin or on the periphery of a washbasin. Furthermore, the outer housing 12 is fastened, in a known manner, on the inner housing 14. This fastening may be such that the outer housing 12, provided with a water outflow, can be pivoted back and forth, for example within a pivoting angle of approximately 160°, about the inner housing 14. However, it is also conceivable for the fastening not to be capable of movement. The intermediate base 20, which in the present example is screwed into the inner housing 14, has a cold-water through-passage 22, a hot-water through-passage (which cannot be seen in FIG. 1) and a schematically indicated mixed-water through-passage 24, which is flow-connected, in a known manner, to the water outlet of the sanitary fitting. The cold-water through-passage 22 and the hot-water through-passage are respectively connected in a known manner to a cold-water supply line and a hot-water supply line. Of course, the intermediate base 20 could be formed integrally on the inner housing 14.

The inner housing 14 bounds circumferentially, and the intermediate base 20 bounds on the base side, an accommodating chamber 26, in which a control cartridge 28 is inserted. In the case of the embodiment shown, the longitudinal axis of the control cartridge 28 coincides with the housing axis 16. A foot 30 of a housing 32 of the control cartridge 28 has a cold-water inlet and a hot-water inlet as well as a mixed-water outlet, which are flow-connected to the corresponding through-passages 22, 24 of the intermediate base 20. On the side which is directed away from the cartridge foot 30, an annular nut 34 butts against the cartridge housing 32, this nut being screwed into an internal thread 36 of the inner housing 14 and being tightened by a certain torque in order to keep the control cartridge 28 in sealing abutment against the intermediate base 20.

The control cartridge 28, furthermore, has a control shank 38 which projects, on the side which is directed away from the cartridge foot 30, beyond the cartridge housing 32 and is mounted in the interior of the cartridge housing 32 such that it can be pivoted about a pivot axis 40 running at right angles to the longitudinal axis 16 of the control cartridge 28. The water throughflow is controlled in a known manner by virtue of the control shank 38 being pivoted about the pivot axis 40. Furthermore, the control shank 38, together with its pivot axis 40, can be rotated about the longitudinal axis 16 of the control cartridge 28 in order for the temperature of the mixed water to be adjusted likewise in a known manner.

It should also be mentioned here that the control shank 38 has a square cross section, two mutually opposite sides running parallel to the pivot axis 40, and that the outer housing 12 and inner housing 14 may be configured integrally, to form a single-piece fitting housing 10. Furthermore, the control shank 38 could also have some other cross section, for example a circular cross section with outer toothing.

As seen in the direction of the housing axis 16, the inner housing 14 terminates more or less at the control-shank end of the cartridge housing 32, while the outer housing 12 projects axially beyond the inner housing 14 and terminates approximately level with the free end of the control shank 38. The annular end side of the outer housing 12 on this side, and thus of the fitting housing 10, is designated by 42.

The control shank 38 has positioned on it a sleeve-like sliding component 44 which, by means of a retaining screw 46 screwed into the control shank 38 from the free front side of the latter, is held in abutment, by way of an inner shoulder, on the front side of the control shank 38, this front side forming a shoulder 48. However, it is also conceivable for the sliding component 44 to have its end which is directed toward the cartridge housing 32 held in abutment against an outer shoulder 48a formed on the control shank 38. The sliding component 44, which is essentially in the form of a square hollow cylinder and is rotationally fixed to the control shank 38, has on its side walls, which run parallel to the pivot axis 40, a respective groove 50 which runs in the longitudinal direction of the control shank 38, is open radially outward and is bounded in the direction of the cartridge housing 32 and in the direction away from the same. If the control shank 38, as mentioned further above, has some other cross section, the inner shape of the sliding component 44 is adapted thereto.

Figure 2:
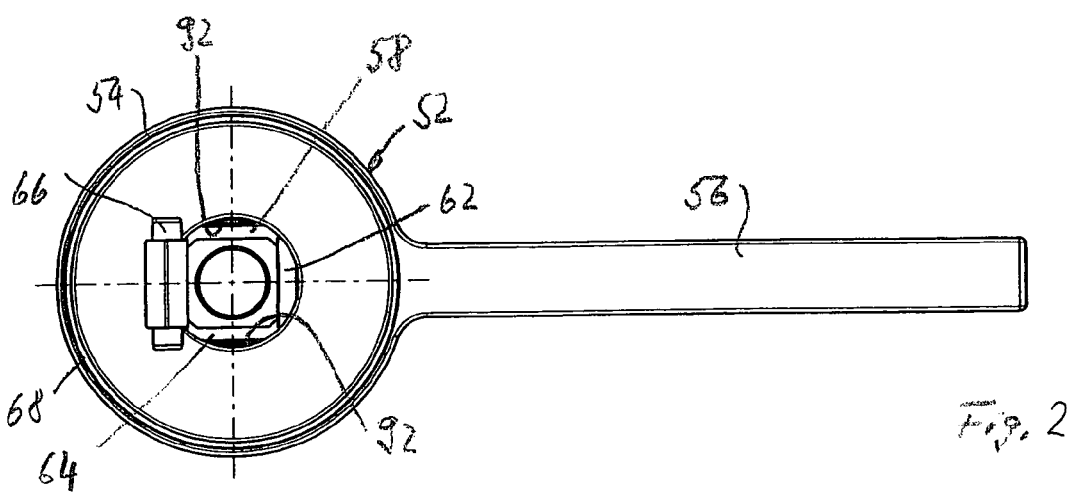
FIG. 2 shows a bottom view of an actuating lever of the sanitary fitting according to FIG. 1.
Figure 3:
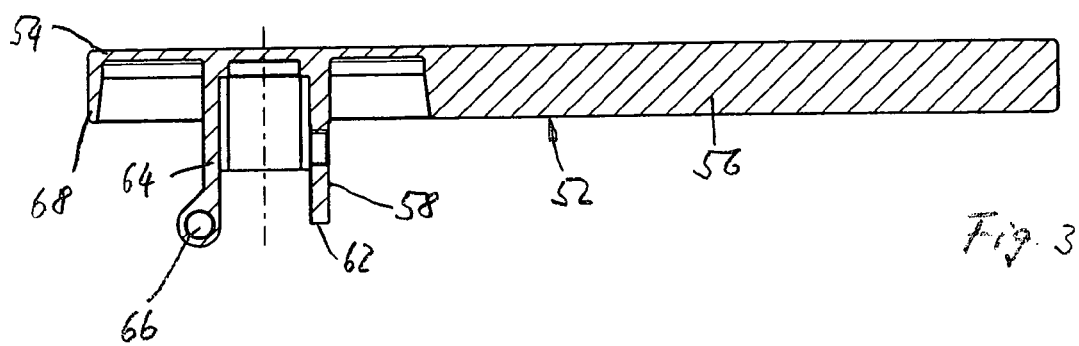
FIG. 3 shows a longitudinal section through the actuating lever.

A control lever 52 which interacts with the control shank 38 via the sliding component 44 is illustrated in part in FIG. 1 and in full in FIGS. 2 and 3. It is of mushroom-like design and a hand lever 56 projects radially outward from its head 54. A hollow-cylindrical stem 58, which projects centrally from the head 54, is joined to the control shank 38, or the sliding component 44, in the longitudinal direction of the control shank and is retained by means of a cap screw 60, which is screwed into the lateral wall 64 of the stem 58, such that it can be moved to a limited extent in the longitudinal direction of the control shank 38, a thread-free, circular-cylindrical end portion of the shank of the cap screw 60 engaging in the groove 50, which is present on that side of the sliding component 44 which is directed toward the hand lever 56. Furthermore, the clear cross section of the blind-hole-like recess of the stem 58, in a manner corresponding to the outer shape of the sliding component 44, is formed with the square cross section. This ensures that the control shank 38 is carried along in rotation when the actuating lever 52 is rotated about the longitudinal axis 16 of the control cartridge 28, without this having to be effected by way of the cap screw 60 interacting with the groove 50. The stem 58 of the actuating lever 52 forms a guide 61, in this case a linear guide, for the control shank 38.

The free end of that side of the lateral wall 64 of the stem 58 which is directed toward the hand lever 56 serves as a stop 62, and the free end region of the lateral wall 64 on the side which is directed away from the hand lever 56 is of thickened design and has a lever pin 66, constituting a lever axis 66, passing through it, this lever pin 66 running parallel to the pivot axis 40 and projecting beyond the stem 58 on both sides.

The head 54 has an encircling collar 68 which is oriented in the direction of the fitting housing 10 and of which the external diameter, in the example shown, coincides with the external diameter of the fitting housing 10, or of the outer housing 12 thereof, and continues the circular-cylindrical shape of the outer lateral surface 18 thereof. Furthermore, in the closed position, which is shown in FIG. 1 and in which the actuating lever 52 is located in a bottom end position 70, the collar 68 is spaced apart from the end side 42 of the outer housing 12 by a narrow uniform encircling gap.

Figure 4:
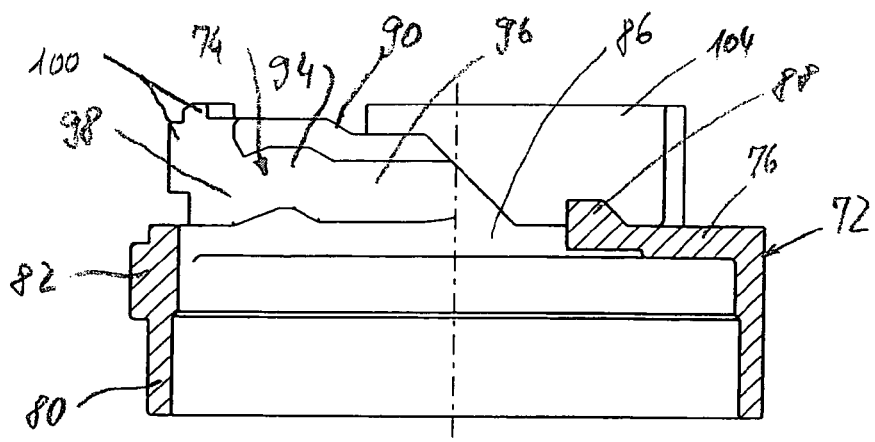
FIG. 4 shows a control part of the sanitary fitting according to FIG. 1 in a longitudinal section along line IV-IV from FIG. 5.
Figure 5:
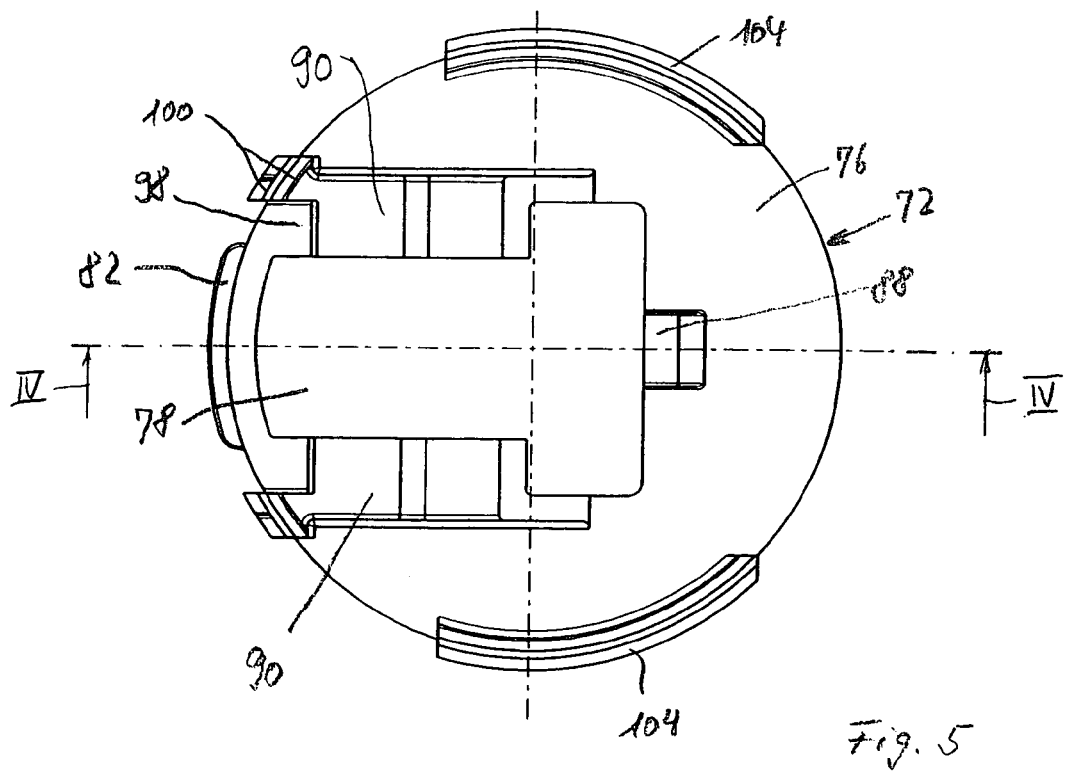
FIG. 5 shows a plan view of the control part.

The lever pin 66 is intended for interacting, on both sides of the stem 58, with a guide track 74 formed on a control part 72. As can be gathered, in particular, from FIGS. 4 and 5, the control part 72 is designed in the form of an upended cup, the base 76 having an essentially rectangular through-opening 78 which—in the installed state—has the control shank 38 passing through it; see, in this respect, FIG. 1. A circular-cylindrical lateral-surface-like wall 80 projects downward, in the installed state in the direction of the cartridge housing 32, from the base 76, and a guide protuberance 82 projects radially outward, in relation to the housing axis 16, from this wall 80 shown on the left-hand side in FIGS. 4 and 5. In the installed state, as shown in FIG. 1, this guide protuberance 82 is guided in an encircling inner groove 84 of the outer housing 12. Furthermore, in the installed state, the wall 80 has its end region which is directed away from the base 76 accommodated in a correspondingly shaped, encircling recess 86 of the outer housing 12. As seen in the direction of the housing axis 16, the inner housing 14 has its end region on this side engaging in the control part 72 and thus ensures that the wall 80 is retained in the recess 86 and that the guide protuberance 82 is retained in the inner groove 84. This also allows the control part 72 to be formed from a plastic.

Diametrically opposite the guide protuberance 82, the base 76 has, on the periphery of the opening 78, an upwardly projecting stop nose 88 which forms an abutment for the stop 62 of the actuating lever 52. For the sake of completeness only, it should be mentioned that the cross section of the opening 78 is widened in a region adjacent to the stop nose 88, approximately as far as the center of the control part 72 for installation purposes.

The guide track 74 is formed in the same, but opposite, form on two mutually opposite guide-track walls 90 which project upward from the base 76. These walls are adjacent to the opening 78 on mutually opposite sides. Furthermore, the spacing between these guide-track walls 90 is coordinated with the stem 58 of the actuating lever 52 in order to interact, with rotary carry-along action, with outer parallel carry-along planes 92 of the stem 58; in respect of the carry-along planes 92, reference is made to FIG. 2.

The groove-like guide track 74 has a hump portion 94, with a hump directed away from the cartridge housing 32 and toward the actuating lever 52, and, in the radially inward direction, an adjoining linear inner portion 96 and a widening outer portion 98, which adjoins the hump in the radially outward direction. This outer portion serves, in turn, for installation purposes. The inner portion 96 and the bottom flank of the outer portion 98 run parallel to a plane which runs at right angles to the housing axis 16, and thus the longitudinal axis of the control cartridge 28, it being the case that, in the bottom pivoting position 70, the control shank 38 is also located along this axis. Furthermore, the hump has, along its crest, a rectilinear part which is parallel to this plane.

Furthermore, carry-along or retaining noses 100 project radially outward and upward from the radially outward part of the two guide-track walls 90, and these noses are intended for interacting with a covering cap 102—cf FIG. 1—for rotary carry-along action. The same purpose is achieved by two circumferentially running carry-along walls 104 which project upward from the base 76.

As can be gathered from FIG. 1, the covering cap 102 has its dome-like portion 106 engaging in the chamber of the actuating lever 52 formed by the head 54, and has its cylinder portion 108, which adjoins the dome-like portion 106, engaging in the outer housing 12. The cylinder portion 108 has recesses formed in the direction of the carry-along walls 104 and carry-along noses 100, in order to ensure rotary carry-along action with the control part 72. The retaining noses and corresponding noses on the carry-along walls 104 prevent release from this rotary carry-along arrangement. Furthermore, the cylinder portion 108 of the covering cap 102 has a radially inwardly directed encircling bead in which is arranged an O-ring 110, which interacts on the other side with the outer housing 12. This O-ring prevents dirt from penetrating into the interior of the fitting housing 10. Furthermore, the dome-like portion 106 of the covering cap 102 has a slot-like through-passage 112 which has the stem 58 of the actuating lever 52 passing through it and allows the movement of the same.

In the case of the exemplary embodiment shown, when the control shank 38 is in the pivoting position corresponding to the bottom end position 70, the distance between the pivot axis 40 and the axis of rotation of the lever pin 66 as measured in the longitudinal direction of the control shank 38 is approximately 1.4 times greater than this distance measured at right angles to the longitudinal direction of the control shank 38. This ratio is preferably between 1 and 2.

Figure 6:
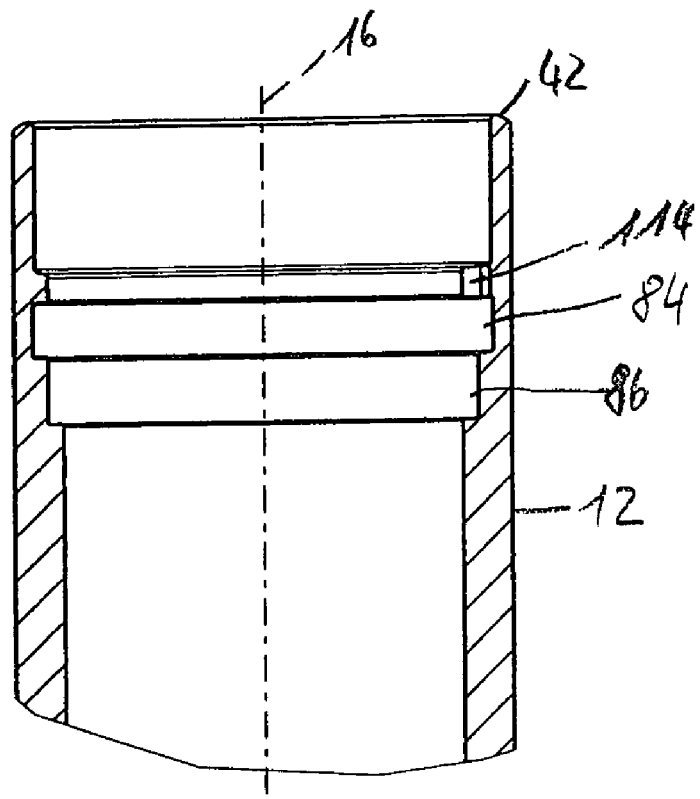
FIG. 6 shows a longitudinal section through part of an outer housing of the fitting housing of the sanitary fitting according to FIG. 2.
Figure 7:
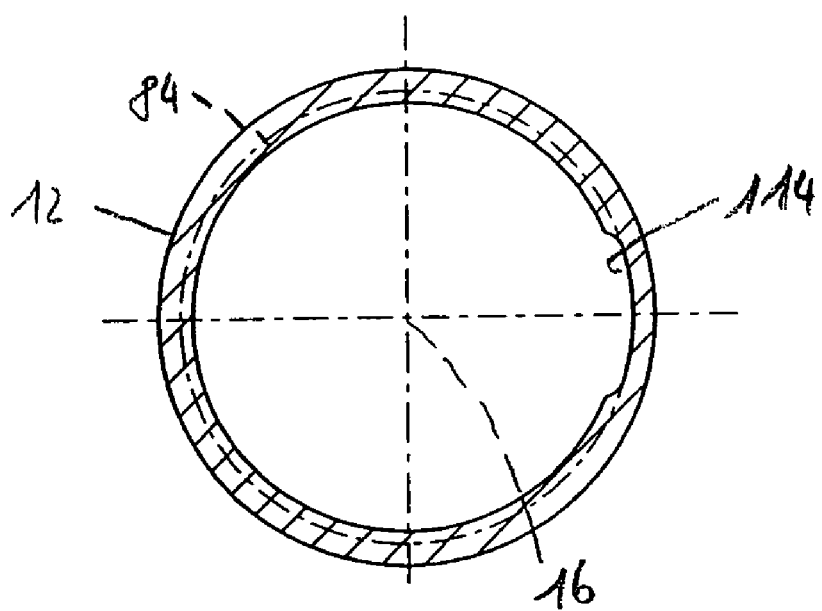
FIG. 7 shows a plan view of the outer housing.

For straightforward installation of the control part 72, the outer housing 12, as can be gathered from FIGS. 6 and 7, has, on the side which is directed toward the hand lever 56 in the installed state, an insertion groove 114, which runs axially from the inner groove 84 in the direction of the end side 42. The control part 72 is inserted axially, with guide protuberance 82 aligned with the insertion groove 114, into the outer housing 14 from the end side 42 and, as soon as the guide protuberance 82 is located in the inner groove 84, is rotated through 180° about the longitudinal axis 16. Since this control part 72 is connected to the control shank 38 for rotary carry-along action, and control cartridges 28 usually allow the control shank 38 to rotate by approximately 60° about the longitudinal axis 16, the control part 72 is reliably retained in a rotatable manner by means of the guide protuberance 82 engaging in the inner groove 84.

As seen in geometrical terms, in the exemplary embodiment shown, the actuating lever 52 is of two-armed design in respect of the control shank 38, a first arm 116, which has the hand lever 56, serving for operating purposes, and the lever pin 66 being arranged on the second arm 116', which, in relation to the first arm 116, is located on the other side of the control shank 38. As a result, when the actuating lever 52 is pivoted up out of its bottom end position 70, the associated pivoting movement of the control shank 38—in the counterclockwise direction in FIG. 1—about the pivot axis 40 means that the lever pin 66 is displaced radially outward—to the left in FIG. 1—and the guide track 74 therefore controls a displacement movement of the actuating lever 54 in relation to the control shank 38 and thus the fitting housing 10, the displacement movement being coupled to the pivoting movement. The displacement movement takes place in a correspondingly opposite direction when the actuating lever 52 is pivoted down into the bottom end position 70. As a result of this controlled displacement movement, the actuating lever 52, or the head 54 thereof, may be located in very close proximity to the end side 42 of the fitting housing 10, the controlled displacement movement resulting in prevention of any conflict between the fitting housing 10 and the actuating lever 52 when the actuating lever 52 is pivoted. There is no need, either on the fitting housing 10 or in the actuating lever 52, for any special, outwardly visible recesses or shaping in order for this conflict to be prevented.

The functioning of that embodiment of the sanitary fittings according to the invention which is shown in FIGS. 1 to 7 will be discussed with reference to FIGS. 8 to 13. The designations used here correspond to those used further above. FIGS. 8 to 13 show, in an illustration like that of FIG. 1, the sanitary fitting with the actuating lever 52 in positions which differ by 5° in each case.

Figure 8:
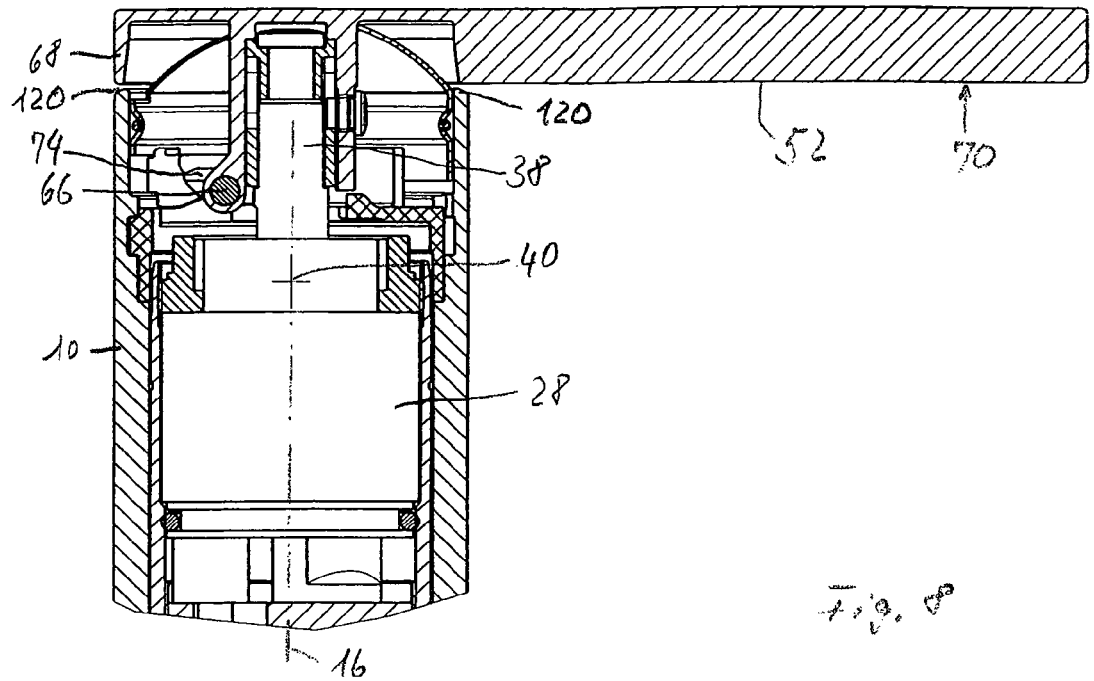
FIG. 8 shows, in an illustration like that of FIG. 1, the sanitary fitting shown in FIG. 1, with the actuating lever in a bottom end position.

In FIG. 8, the actuating lever 52 is located in its bottom end position 70, as is also the case in FIG. 1. The control shank 38 runs in the direction of the longitudinal axis of the control cartridge 28 and thus, in the present case, of the housing axis 16. In this position of the control shank 38, the water flow through the sanitary fitting is interrupted. The lever pin 66 is located, on that side of the hump which is directed toward the control shank 38, in the inner portion 96, at the transition of the latter into the hump portion 94; cf. FIG. 4. A narrow encircling gap of constant width is present between the collar 68 and the fitting housing 10.

Figure 9:
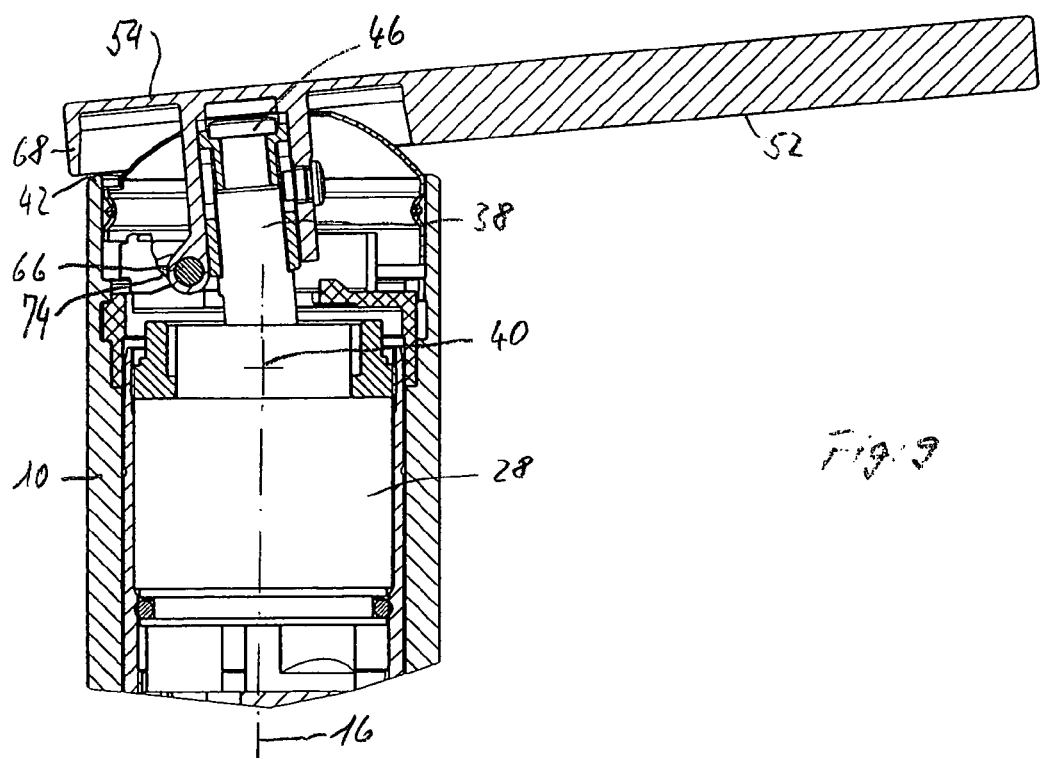
FIG. 9 shows, in an illustration like that of FIG. 8, the sanitary fitting with the actuating lever pivoted up through 5° out of the bottom end position.

In order to start the water flow through the sanitary fitting, the actuating lever 52 is pivoted up out of its bottom end position 70. In FIG. 9, it has been pivoted through 5° in relation to the bottom end position 70. Correspondingly, the control shank 38 has also been pivoted through 5° in the counterclockwise direction in relation to the longitudinal axis 16 of the control cartridge 28. This pivoting movement results in a translatory displacement of the lever pin 66 into the hump portion 94 and, there, into the upwardly sloping branch. In addition to the pivoting movement of the actuating lever 52 about the pivot axis 40, this actuating lever has been raised in accordance with the shape of the guide track 74 in the longitudinal direction of the actuating lever 52. This can be seen particularly readily by the spacing between the retaining screw 46 and the head 54 of the actuating lever 52, in comparison with the relevant spacing in FIG. 8. The actuating lever 52 does not come into contact with the fitting housing 10 as a result of being raised as described. The round shape of the fitting housing 10 and of the collar 68 means that the latter runs past the end side 42 with a spacing therebetween.

Figure 10:
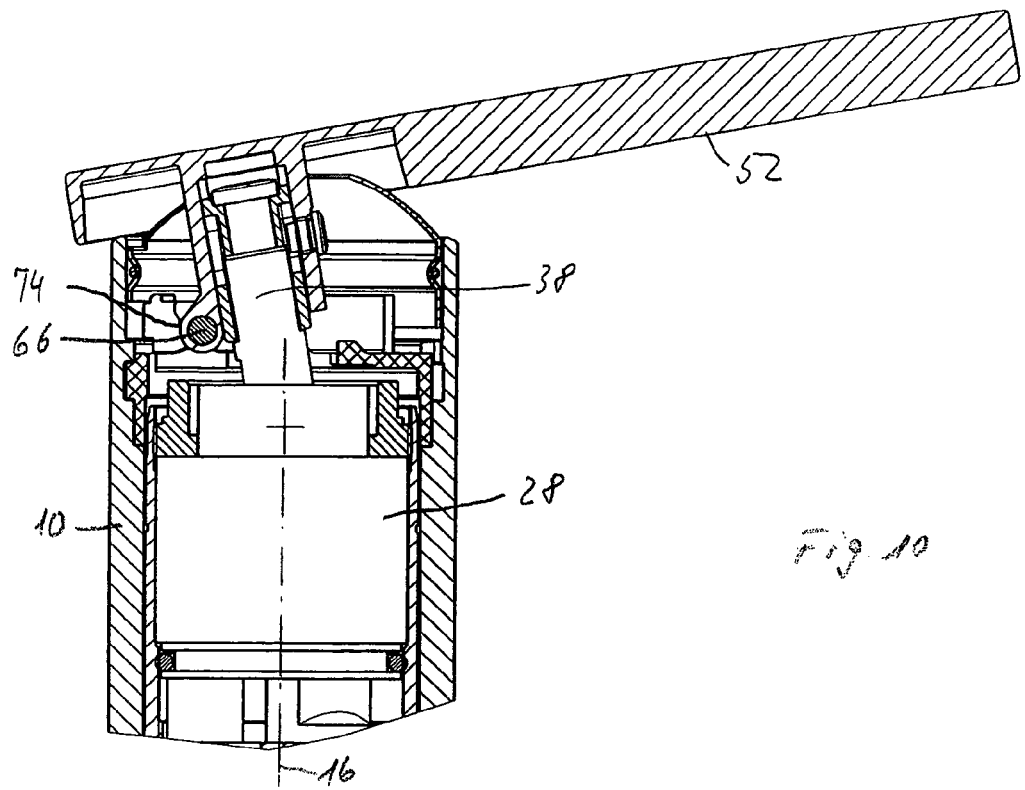
FIG. 10 shows, in an illustration like that of FIGS. 8 and 9, the sanitary fitting with the actuating lever pivoted up through 10° out of the bottom end position.

FIG. 10 shows the actuating lever 52 pivoted up through a further 5°, i.e. through 10° in relation to the bottom end position 70. The corresponding pivoting of the control shank 38 has led to displacement of the lever pin 66 into the region of the crest of the guide track 74, which has resulted in a further displacement movement of the actuating lever 52 relative to the control shank 38. This prevents contact between the actuating lever 52 and the fitting housing 10 over a correspondingly wider range in the direction at right angles to the drawing plane of FIG. 10.

Figure 11:
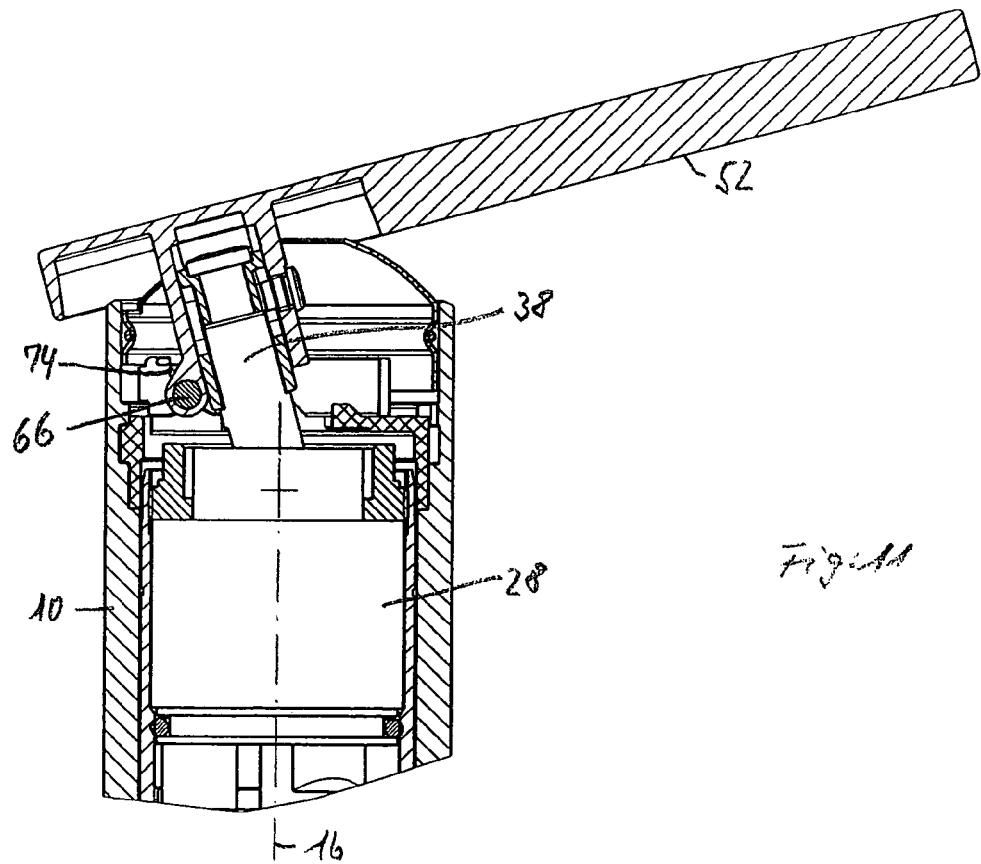
FIG. 11 shows, in an illustration like that of FIGS. 8 to 10, the sanitary fitting with the actuating lever pivoted up through 15° out of the bottom end position.

FIG. 11 shows the situation in which the actuating lever 52 has been pivoted up through a further 5°, i.e. through 15° in relation to the bottom end position 70. The lever pin 66 here has been displaced to that end of the crest which is directed toward the outer portion 98, which has resulted in the actuating lever 52 being raised further in relation to the control shank 38. Relative to the fitting housing 10, in FIGS. 10 and 11 the lever pin 66 is located in the same position, as seen in the direction of the housing axis 16; as a result of the circular shape of the fitting housing 10 and of the collar 68, however, the more pronounced oblique position of the actuating lever 52 in FIG. 11, in comparison with that in FIG. 10, results in the prevention of contact between the actuating lever 52 and fitting housing 10.

Figure 12:
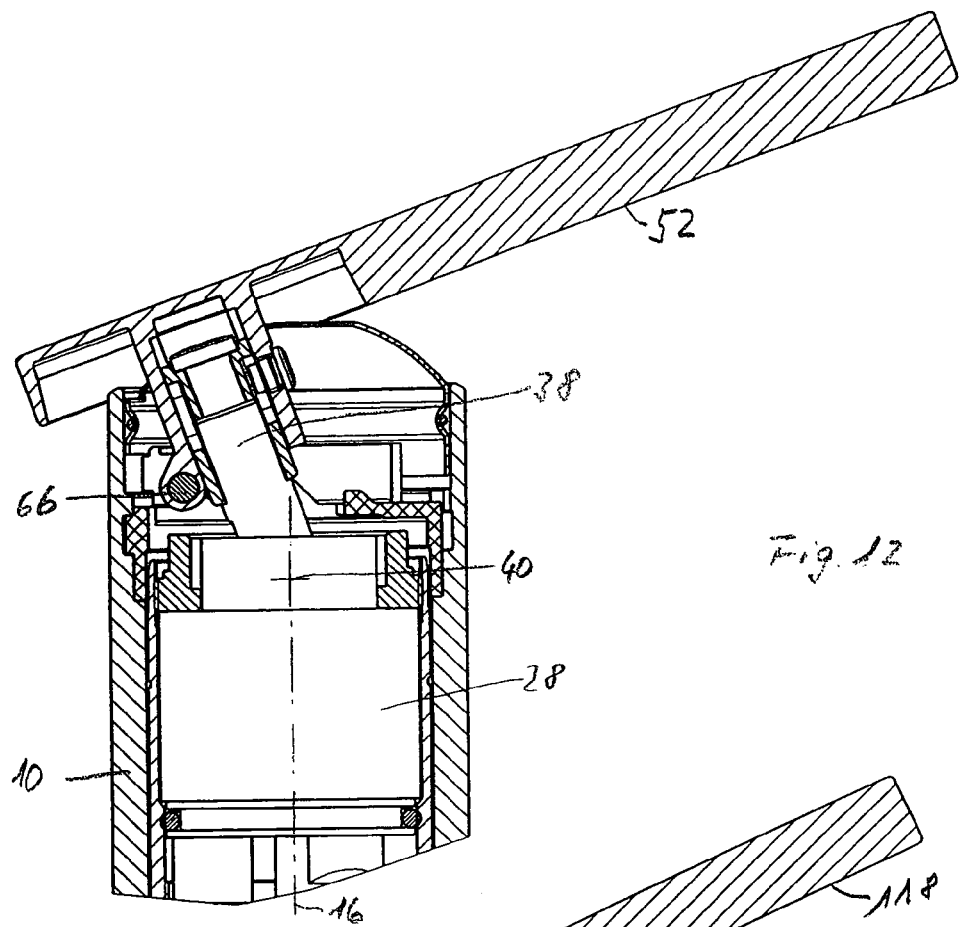
FIG. 12 shows, in an illustration like that of FIGS. 8 to 11, the sanitary fitting with the actuating lever pivoted up through 20° out of the bottom end position.

In FIG. 12, the actuating lever 52, in comparison with FIG. 11, has been pivoted up through a further 5°, and thus through 20° in relation to the bottom end position 70. The lever pin 66 here has passed through the downwardly sloping part of the hump portion 94, this part being directed toward the outer portion 98. Since this hump portion 94 runs approximately at right angles to the current longitudinal direction of the control shank 38, the actuating lever 52, during the abovementioned movement, has maintained is displacement position in relation to the control shank 38. As a result of the pivoting movement about the pivot axis 40, however, the actuating lever 52 has executed a further movement to the left—in the illustration of FIG. 12—and this also avoids conflict between the fitting housing 10 and the actuating lever 52.

Figure 13:
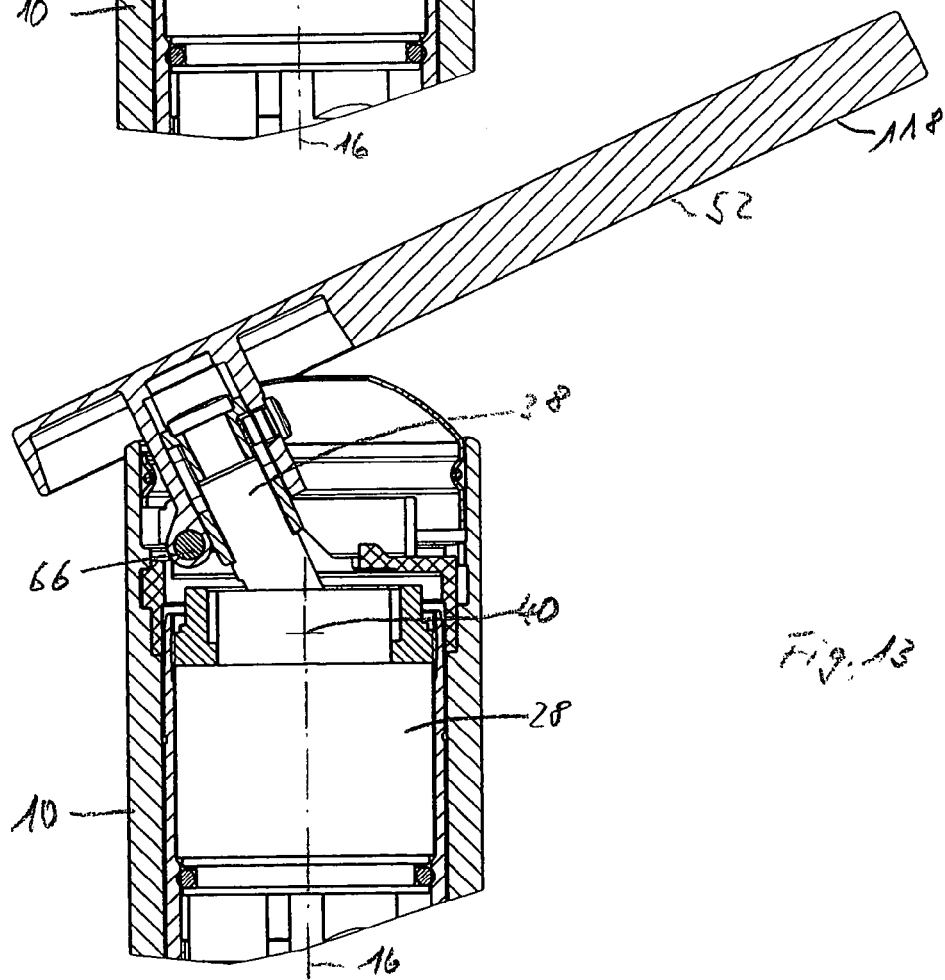
FIG. 13 shows, in an illustration like that of FIGS. 8 to 12, the sanitary fitting with the actuating lever pivoted up through 25° out of the bottom end position into a top end position.

FIG. 13 shows the actuating lever 52 pivoted up through 25° in relation to the bottom end position 70 into the top end position 118. The water flow through the sanitary fitting is thus at a maximum. As a result of the corresponding pivoting movement of the control shank 38, the lever pin 66, in comparison with FIG. 12, has been displaced in the outer portion 98 of the guide track 74, this outer portion running at right angles to the longitudinal axis 16, and this, as a result of the increasingly oblique position of the control shank 38, has led to the actuating lever 52 being raised further relative to the control shank 38. The displacement mentioned above is at a maximum in the top end position 118.

If the actuating lever 52 is pivoted down from its top end position 118 into its bottom end position 70, the relative movement between the control shank 38 and the actuating lever 52 takes place, in relation to what has been explained above, in reverse.

If the actuating lever 52 is located in its bottom end position 70, as can be gathered from FIG. 1, the stop 62 is spaced apart from the abutment formed by the stop nose 88. If, however, the actuating lever 52 is moved beyond the bottom end position 70 by a correspondingly high level of force being applied, the stop 62 comes into abutment against the stop nose 88 following a limit angle. This prevents, on the one hand, the control cartridge 28 from being subjected to excessive stressing and, on the other hand, the actuating lever 52 and the fitting housing 10 from coming into contact with one another. Over-bending of the control shank 38 is also prevented; the risk of over-bending is present, in particular, in the case of control shanks 38 made of plastic.

If the mixed-water temperature is to be changed, the actuating lever 52 is rotated, in a known manner, about the longitudinal axis 16 of the control cartridge 28. It is also the case here that the guide track 74, or the control part 72 in which the guide track 74 is formed, and the covering cap 102 are rotated along. The control of the displacement movement of the actuating lever 52 as a function of the pivoting position of the latter is thus independent of the rotary position.

Since, in the exemplary embodiment shown, the guide track 74, or the control part 72 in which the guide track is formed, is mounted for rotation in a predetermined axial position on the fitting housing 10, the actuating lever 52, as seen in the direction of the housing axis 16, is always located in a same position irrespective of the position of the control cartridge 28. Allowances can therefore readily be made for tolerances in the position of the control cartridge 28.

By changing the shape of the guide track 74 and the position of the lever pin 66 in relation to the pivot axis 40, as well as the spacing between the lever pin and the pivot axis, it is possible for the displacement movement of the actuating lever 52 relative to the control shank 38 to be adapted to the desired situation. It is also conceivable, instead of using a guide-track control means, for the lever pin 66 to be articulated relative to the fitting housing 10 via lugs, in order to achieve a corresponding displacement movement when the actuating lever 52 is pivoted.

In the exemplary embodiment shown, the actuating lever 52 is guided on the control shank 38 such that it can be displaced linearly exclusively in the longitudinal direction of the control shank 38. The actuating lever 52 extends at right angles to this guide direction. It is also possible, however, for the guide 61 to run at some other angle to the longitudinal direction of the actuating lever 52. Furthermore, it is also conceivable for the actuating lever 52 to be articulated in a stationary manner on the fitting housing 10 by means of its lever pin 66, for example at one of the articulation locations designated by 120 in FIG. 8. This would also prevent conflict, during pivoting of the actuating lever 52, between the latter and the fitting housing 10. However, in this case, it would also be necessary for the guiding means of the control shank 38 on the actuating lever 52 to be pivotable about an axis parallel to the pivot axis 40 and lever pin 66. The preferred embodiment, however, is that as is illustrated in the figures, and is described above, or a similar embodiment.

If the housing axis 16 and the longitudinal axis of the control cartridge 28 do not coincide, the relationships specified relate to the longitudinal axis of the control cartridge 28.

If the actuating lever 52 need not be rotatable about the housing axis 16 or the longitudinal axis of the control cartridge 28, the guide track 74 could be formed on the fitting housing or a control part 72 arranged in an immovable manner thereon.

What is claimed is:

1. A sanitary fitting comprising:
    a fitting housing;
    a control cartridge, which is arranged in the fitting housing, and which includes a control shank, that is structured to be pivoted about a pivot axis;
    a control part, which is arranged on the fitting housing; and
    an actuating lever, that interacts with the control shank, and is pivotable up and down about a lever axis running parallel to the pivot axis between a bottom end position and a top end position in order to pivot the control shank about the pivot axis and to thereby control the water flow, wherein
        the control shank is accommodated in a guide of the actuating lever; and
        the lever axis is mounted in a guide track of the control part such that the lever can be displaced along the guide track.

2. The sanitary fitting according to claim 1, wherein, in respect of the guide, the actuating lever includes a first arm serving for operating purposes and the lever axis is arranged on a second arm.

3. The sanitary fitting according to claim 1, wherein the guide track has a hump, and in the bottom end position and in the top end position of the actuating lever, the lever axis is located on different sides of the hump.

4. The sanitary fitting according to claim 3, wherein the guide track has portions between which the hump is located and which is substantially parallel to a plane which, when the actuating lever has been pivoted down into the bottom end position, is at right angles to the control shank.

5. The sanitary fitting according to claim 1, wherein the control part has a stop for the actuating lever in order to prevent the actuating lever from being pivoted down beyond the bottom end position, or beyond a limit angle beyond the bottom end position.

6. The sanitary fitting according to claim 1, wherein the control shank, together with the actuating lever can be rotated about an axis running at right angles to the pivot axis, and the control part can be rotated along therewith.

7. The sanitary fitting according to claim 6, wherein the control shank passes through an opening in the control part, and the control part has mutually opposite guide-track walls, which interact with the control shank, or the guide thereof, for rotary carry-along action.

8. The sanitary fitting according to claim 1, wherein the control shank is guided in the guide such that the control shank can be displaced linearly exclusively in a direction running transversely to the actuating lever.

9. The sanitary fitting according to claim 8, wherein the control shank is displaced linearly exclusively in a direction running transversely at least more or less at right angles to the actuating lever.

* * * * *